(12) United States Patent
Justiss et al.

(10) Patent No.: US 7,370,173 B2
(45) Date of Patent: *May 6, 2008

(54) METHOD AND SYSTEM FOR PRESENTING CONTIGUOUS ELEMENT ADDRESSES FOR A PARTITIONED MEDIA LIBRARY

(75) Inventors: Steven A. Justiss, Lakeway, TX (US); Alexander Kramer, Austin, TX (US); Linlin Gao, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/045,443

(22) Filed: Jan. 28, 2005

(65) Prior Publication Data

US 2006/0174088 A1    Aug. 3, 2006

(51) Int. Cl.
*G06F 12/00* (2006.01)
*G06F 13/00* (2006.01)

(52) U.S. Cl. .................. 711/202; 711/154; 711/200
(58) Field of Classification Search ................ 711/100, 711/154, 200, 202; 707/100; 717/163
See application file for complete search history.

(56) References Cited

U.S. PATENT DOCUMENTS

| | | | |
|---|---|---|---|
| 4,104,718 A * | 8/1978 | Poublan et al. ................ 707/8 |
| 4,430,701 A * | 2/1984 | Christian et al. ............ 711/119 |
| 4,945,428 A | 7/1990 | Waldo | |
| 5,214,768 A | 5/1993 | Martin et al. | |
| 5,455,926 A | 10/1995 | Keele et al. | |
| 5,506,986 A | 4/1996 | Healy | |
| 5,546,315 A | 8/1996 | Kleinschnitz | |
| 5,546,557 A | 8/1996 | Allen et al. | |
| 5,548,521 A | 8/1996 | Krayer et al. | |
| 5,568,629 A | 10/1996 | Gentry et al. | |

(Continued)

FOREIGN PATENT DOCUMENTS

EP    1156408 A1    11/2001

(Continued)

OTHER PUBLICATIONS

International Search Report for PCT/US03/35824, Dec. 6, 2004.

(Continued)

*Primary Examiner*—Tuan V. Thai
(74) *Attorney, Agent, or Firm*—Sprinkle IP Law Group (57) ABSTRACT

According to one embodiment of the present invention, a controller that partitions a media library for multiple host applications can, for each partition, assign a base element address for an element type and associate physical element addresses for elements of an element type with an index value. For a partition, the logical element address corresponding to a physical element address for an element can be determined by adding the index number associated with the physical element address to the base element address for that element type. The physical element address corresponding to a logical element address for an element can be determined by subtracting the base element address for the element type from the logical element address for the element. The result of subtracting the base element address from the logical element address is an index value for which the associated physical element address can be found.

20 Claims, 6 Drawing Sheets

U.S. PATENT DOCUMENTS

| | | |
|---|---|---|
| 5,592,638 A | 1/1997 | Onodera |
| 5,598,385 A | 1/1997 | Mizukami et al. |
| 5,612,934 A | 3/1997 | Dang et al. |
| 5,740,061 A | 4/1998 | Dewey et al. |
| 5,764,615 A | 6/1998 | Ware et al. |
| 5,790,852 A | 8/1998 | Salm |
| 5,892,633 A | 4/1999 | Ayres et al. |
| 5,914,919 A | 6/1999 | Fosler et al. |
| 5,959,866 A | 9/1999 | Hanaoka et al. |
| 6,031,798 A | 2/2000 | James et al. |
| 6,041,329 A | 3/2000 | Kishi |
| 6,041,381 A | 3/2000 | Hoese |
| 6,044,442 A | 3/2000 | Jesionowski |
| 6,052,341 A | 4/2000 | Bingham et al. |
| 6,058,494 A | 5/2000 | Gold et al. |
| 6,085,123 A | 7/2000 | Baca et al. |
| 6,185,165 B1 | 2/2001 | Jesionowski et al. |
| 6,327,519 B1 | 12/2001 | Ostwald et al. |
| 6,327,594 B1 | 12/2001 | Van Huben et al. |
| 6,328,766 B1 | 12/2001 | Long |
| 6,336,172 B1 | 1/2002 | Day, III et al. |
| 6,356,803 B1 | 3/2002 | Goodman et al. |
| 6,360,232 B1 | 3/2002 | Brewer et al. |
| 6,374,241 B1 | 4/2002 | Lamburt et al. |
| 6,385,706 B1 | 5/2002 | Ofek et al. |
| 6,425,035 B2 | 7/2002 | Hoese et al. |
| 6,425,059 B1 | 7/2002 | Basham et al. |
| 6,480,934 B1 | 11/2002 | Hino et al. |
| 6,487,561 B1 | 11/2002 | Ofek et al. |
| 6,493,721 B1 | 12/2002 | Getchius et al. |
| 6,507,889 B1 * | 1/2003 | Tsurumaki et al. ......... 711/112 |
| 6,574,641 B1 | 6/2003 | Dawson et al. |
| 6,604,165 B1 * | 8/2003 | Terao ............................ 711/5 |
| 6,665,786 B2 | 12/2003 | McMichael et al. |
| 6,675,260 B2 | 1/2004 | Torrey et al. |
| 6,715,031 B2 | 3/2004 | Camble et al. |
| 6,725,352 B2 | 4/2004 | Goodman et al. |
| 6,725,394 B1 | 4/2004 | Bolt |
| 6,738,885 B1 | 5/2004 | Zhang et al. |
| 6,763,419 B2 | 7/2004 | Hoese et al. |
| 6,772,231 B2 | 8/2004 | Reuter et al. |
| 6,804,753 B1 | 10/2004 | Moody, II et al. |
| 6,839,824 B2 | 1/2005 | Camble et al. |
| 6,845,431 B2 | 1/2005 | Camble et al. |
| 6,950,723 B2 * | 9/2005 | Gallo et al. .................. 700/214 |
| 7,136,988 B2 * | 11/2006 | Gallo .......................... 711/217 |
| 2001/0020197 A1 | 9/2001 | Nakano et al. |
| 2002/0004883 A1 | 1/2002 | Nguyen et al. |
| 2002/0019863 A1 | 2/2002 | Reuter et al. |
| 2002/0144048 A1 | 10/2002 | Bolt |
| 2002/0169521 A1 | 11/2002 | Goodman et al. |
| 2002/0188592 A1 | 12/2002 | Leonhardt et al. |
| 2002/0199077 A1 | 12/2002 | Goodman et al. |
| 2003/0014585 A1 | 1/2003 | Ji |
| 2003/0070053 A1 | 4/2003 | Gallo et al. |
| 2003/0084240 A1 | 5/2003 | Torrey et al. |
| 2003/0126360 A1 | 7/2003 | Camble et al. |
| 2003/0126361 A1 | 7/2003 | Slater et al. |
| 2003/0126362 A1 | 7/2003 | Camble et al. |
| 2003/0126395 A1 | 7/2003 | Camble et al. |
| 2003/0126396 A1 | 7/2003 | Camble et al. |
| 2003/0126460 A1 | 7/2003 | Camble et al. |
| 2003/0131157 A1 | 7/2003 | Hoese et al. |
| 2003/0131253 A1 | 7/2003 | Martin et al. |
| 2003/0135580 A1 | 7/2003 | Camble et al. |
| 2003/0212873 A1 | 11/2003 | Lee et al. |
| 2003/0221054 A1 | 11/2003 | Wu |
| 2004/0044871 A1 | 3/2004 | Weber et al. |
| 2004/0054838 A1 * | 3/2004 | Hoese et al. ................. 710/305 |
| 2004/0064641 A1 | 4/2004 | Kodama |
| 2004/0088513 A1 | 5/2004 | Biessener et al. |
| 2004/0107300 A1 | 6/2004 | Padmanabhan et al. |
| 2004/0111580 A1 | 6/2004 | Weber et al. |
| 2004/0133915 A1 | 7/2004 | Moody, II et al. |
| 2004/0139094 A1 | 7/2004 | Tyndall et al. |
| 2004/0139240 A1 | 7/2004 | DiCorpo et al. |
| 2004/0139260 A1 | 7/2004 | Steinmetz et al. |
| 2004/0148460 A1 | 7/2004 | Steinmetz et al. |
| 2004/0148461 A1 | 7/2004 | Steinmetz et al. |
| 2006/0069844 A1 * | 3/2006 | Gallo et al. ..................... 711/4 |
| 2006/0149919 A1 * | 7/2006 | Arizpe et al. ................ 711/206 |

FOREIGN PATENT DOCUMENTS

| | | |
|---|---|---|
| WO | WO02/27463 A2 | 4/2002 |
| WO | WO03/104971 A1 | 12/2003 |

OTHER PUBLICATIONS

International Search Report for PCT/US 03/35822, Dec. 6, 2004.
Working Draft NCITS T10 Project 999D, "Information Technology—SCSI-3 Medium Changer Commands (SMC)", pp. 1-68, Mar. 4, 1998.
Working Draft INCITS T10 Project 1383D, Information Technology—SCSI Media Changer Commands—2 (SMC-2), pp. i-x and 1-58, Nov. 18, 2003.
U.S. Patent Office Official Action issued in U.S. Appl. No. 10,704,265, Tyndall et al., filed May 3, 2007.
U.S. Patent Office Official Action issued in U.S. Appl. No. 11/046,019, Justiss et al., filed May 9, 2007.
U.S. Patent Office Official Action issued Jul. 5, 2007 in U.S. Appl. No. 11/046,066, Justiss et al.

\* cited by examiner

FIGURE 1

Partition 1 — 202

| Element Type | Starting Address | Number of Elements |
|---|---|---|
| Medium Transport Element | 00h | 1 |
| Data Storage Element | 20h | 13 |
| Import/Export Element | 1C0h | 1 |
| Data Transfer Element | 1E0h | 1 |

Partition 2 — 204

| Element Type | Starting Address | Number of Elements |
|---|---|---|
| Medium Transport Element | 00h | 1 |
| Data Storage Element | 20h | 12 |
| Import/Export Element | 1C0h | 0 |
| Data Transfer Element | 1E0h | 1 |

METHOD AND SYSTEM FOR PRESENTING CONTIGUOUS ELEMENT ADDRESSES FOR A PARTITIONED MEDIA LIBRARY

TECHNICAL FIELD OF THE INVENTION

Embodiments of the invention relate generally to providing access to a media library and more particularly to systems and methods for presenting noncontiguous physical element addresses for elements of the media library as contiguous logical element addresses.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-media command to the robot and the robot moves the tape cartridge.

In a SCSI tape library, devices that are part of the library are typically addressed on a network or bus by target number and logical unit numbers ("LUN"). Thus, each drive and media changer of a tape library typically has a target number and LUN. Cartridge slots, on the other hand, are addressed by element addresses that are used by the robot to locate the slots. Because the robot also places tape cartridges in the drives, each drive is also associated with an element address. The robot is also assigned an element address. If multiple tape libraries are connected to a single device (e.g., a Fibre Channel to SCSI routing device), the tape libraries may be further addressed by bus number.

The operation of traditional media libraries leads to problems when multiple hosts attempt to access the media library. For instance, two or more hosts may attempt to access the same cartridge slot at the same time, but for data at different locations on the tape. In this situation, there is a conflict and the tape library system must somehow resolve the issue of which host's access request the system will respond to. The conflict becomes even more apparent when the tape library system has more than one tape drive. The system then has to resolve not only the question of which access request to respond to, but also which tape drive the tape should be loaded into. Therefore, it is desirable to control access to media libraries by multiple hosts in a manner that reduces or prevents conflicts. Moreover, many host applications expect that all types of element addresses in a media library will be contiguous. Indeed, contiguous element addresses are required by the SCSI Media Changer ("SMC") and SMC-2 standards. Therefore, the mechanism that provides access to the media library should provide access in a manner that allows each host application to see contiguous element addresses.

SUMMARY OF THE INVENTION

Embodiments of the present invention provide a system and method of providing media library access that allows noncontiguous physical element addresses to be presented as contiguous logical element addresses and contiguous logical element addresses to be mapped to noncontiguous physical element addresses.

One embodiment of the present invention includes a method for mapping between physical element addresses of a media library and a set of contiguous logical element addresses. The method comprises establishing a base logical element address for an element type (e.g., storage element, data transfer element, medium transport element, import export element or other element of a media library) and associating each physical element address from a set of physical element addresses for elements of the element type with an index value from an index of sequential index values. In other words, each physical element address from a set of physical element addresses (e.g., the physical element addresses for elements assigned to a partition) is associated with an index value from an index of sequential values. In should be noted that at least one physical element address in the set of physical element addresses can be noncontiguous with the next physical element address in the set of physical element addresses (i.e., the physical element addresses for elements of the element type can be disjointed). The method can further comprise determining a corresponding logical element address for each physical element address based on the associated index value for that physical element address and the base logical element address. More particularly, the associated index value for a physical element address can be added to the base logical element address to determine the corresponding logical element address. Additionally, the method can include determining the corresponding physical element address for a particular logical element address based on the logical element address, the base logical element address and the associated index value for the physical element address. For example, the base logical element address can be subtracted from the given logical element address to determine the associated index value. The physical address for the associated index value can then be determined from a lookup table or other data structure.

Another embodiment of the present invention can include a computer program product comprising a set of computer instructions stored on a computer readable medium. The set of computer instructions comprise instructions executable to establish a base logical element address for an element type, associate each physical element address from a set of physical element addresses for elements of the element type with an index value from an index of sequential index values, determine a corresponding logical element address based on an associated index value for that physical element address and the base logical element address. According to one embodiment, at least one physical element address in the set of physical element addresses is not contiguous with the next physical element address in the set of physical element addresses.

Yet another embodiment of the present invention includes a controller to control access to a media library. The controller comprises a first interface to connect to a first data transport medium, a second interface to connect to a second data transport medium, a buffer to provide a memory workspace for the controller connected to the first interface and the second interface and a processing unit coupled to the first interface, the second interface and the buffer. The processing unit is operable to establish a base logical element address for an element type and associate each physical element address from a set of physical element addresses for elements of the element type with an index value from an index of sequential index values, wherein at least one physical element address in the set of physical element addresses is not contiguous with the next physical element address in the set of physical element addresses. Additionally, for each physical element address from the set of physical element addresses, the controller is operable to determine a corresponding logical element address based on an associated index value for that physical element address and the base logical element address.

Embodiments of the present invention allow for flexible address assignment of physical elements to logical partitions. Logical partitions can be used to map to physical elements at a media library that have disjoint addresses and are widely distributed within the actual library.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

For purposes of this application, physical element addresses refer to the addresses used by a media changer to refer to elements (medium transport element, storage element, import/export element and data transfer elements) of a media library. The physical element addresses represent the locations used by the medium transport element to move storage volumes (e.g., tapes, optical disks or other media) and the medium transport element itself. Logical element addresses are addresses used to represent the physical element addresses to host applications that, for a given element, may or may not match the physical element address.

To resolve the problem of controlling access to a media library by multiple hosts, the media library can be partitioned. In partitioned media libraries, a larger media library is presented to hosts as one or more logical media libraries, with each logical media library representing some portion or all of the physical media library. Embodiments of partitioning a media library are described in U.S. Pat. No. 6,804,753, entitled "Partitioned Library", issued Oct. 12, 2004, by Moody et al. and assigned to Crossroads Systems, Inc. of Austin Tex. and U.S. patent application Ser. No. 10/704,265, entitled "System and Method for Controlling Access to Multiple Physical Media Libraries", filed Nov. 7, 2003, by Tyndall et al. and assigned to Crossroads Systems, Inc. of Austin Tex., each of which is fully incorporated by reference herein. In various implementations access control to a partitioned media library can be provided by a single device (e.g., a router or other device) or can be provided by multiple devices (e.g., multiple routers or other devices) in a distributed or centralized manner. One embodiment of centralized access control is described in U.S. patent application Ser. No. 10/880,360, entitled "System and Method for Centralized Partitioned Library Mapping", filed Jun. 29, 2004, by Justiss et al. and assigned to Crossroads Systems, Inc. which is hereby fully incorporated by reference herein. U.S. patent application Ser. No. 10/880,162, entitled "System and Method for Distributed Partitioned Library Mapping", filed Jun. 29, 2004 by Justiss et al. and assigned to Crossroads Systems, Inc., which is hereby fully incorporated by reference herein, describes an embodiment of providing distributed access control to a media library.

In partitioning a media library, the various elements (e.g., storage elements, medium transport elements, import/export elements, data transfer elements) can be assigned logical element addresses by the device that provides access control to the media library. While this can be done in an arbitrary manner, the SCSI-2 and SCSI-3 Medium Changer ("SMC") specifications (SMC, SMC-2), require that element addresses of a given element type be contiguous. Therefore, host applications that wish to access a media library expect to see storage elements listed in contiguous order, data transfer elements listed in contiguous order and so on. Embodiments of the present invention provide a mechanism to present contiguous and noncontiguous elements of a physical media library as if they were contiguous.

Figure 1:
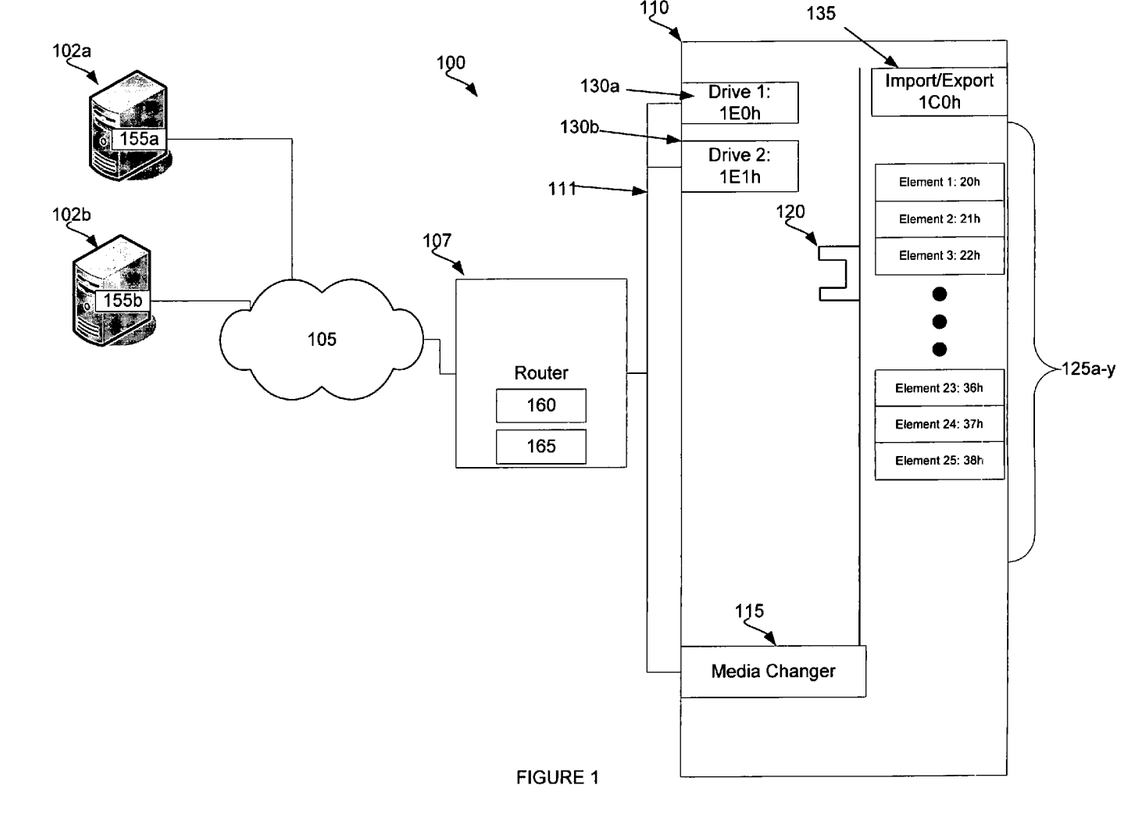
FIG. 1 is a diagrammatic representation of one embodiment of a system in which embodiments of the present invention can be implemented.

FIG. 1 illustrates one embodiment of a system 100 for partitioning a media library. System 100 includes multiple hosts 102a-102b connected via a first data transport medium 105 (e.g., a storage area network, a LAN, a WAN or other network known in the art) to a controller 107 that controls access to media library 110. Controller 107 can be connected to media library 110 by a second data transport medium 111 that can be the same as or different than first data transport medium 105. Media library 110 is typically a variation of a SCSI media changer, which generally contains at least one media changer 115 with an associated medium transport element 120 (alternatively referred to as a "robot" or "picker"), multiple storage elements 125a-y ("element 1" through "element 25") that can store storage volumes (e.g., tape cartridges, optical disks), and multiple data transfer elements ("drive 1" and "drive 2") 130a and 130b. Media library 110 can also have import/export element 135. The media changer 115 is often a microprocessor based embedded controller that controls medium transport element 120. Medium transport element 120 physically moves storage volumes from one element to another based on element addresses provided to media changer 115. For example, medium transport element 120 can move a storage volume from a storage element to a data transfer element in response to a "MOVE MEDIUM" command.

In a partitioned library, a large, multi-storage element, multi-data transfer element physical library is represented to applications running on hosts (e.g., applications 155a-155b) as a number of different potentially smaller libraries, each with some allocated number of storage elements, some allocated number of data transfer elements, and some number of allocated import/export elements. Each host may see a different media library that represents some subset (or all) of media library 110. Thus, for example, application 155a running on host 102a may see a different media library than application 155b running on host 102b.

Access to the physical media library in system 100 is provided by controller 107. Controller 107 can maintain logic to perform logical-to-physical mappings for the media library partitions and present the host applications with the appropriate media library partitions. Each host application can then form commands based on the media library partition presented to it. Controller 107 can map the commands to the appropriate physical addresses and forward the commands to media library 110. This can include, for example, mapping target numbers, LUNs and element addresses.

Controller 107 can be implemented at any point in the command path between host applications and physical media library 110. According to one embodiment of the present invention, controller 107 can be implemented as a storage router with software and/or hardware programming. For purposes of this application a storage router is any device that routes or manages data to and from storage devices, hosts and/or both, including, but not limited to storage area network ("SAN") storage appliances, network attached storage ("NAS") storage appliances, RAID controllers, host bus adapters ("HBA") and other devices that can route/process storage related commands. Each storage router can be, for example, a Fibre Channel to SCSI routing device; Fibre Channel to Fibre Channel routing device; SCSI to SCSI routing device; iSCSI to iSCSI routing device; Fibre Channel to iSCSI routing device; ISCSI to Fibre Channel routing device; iSCSI to SCSI routing device; SCSI to iSCSI routing device; Fibre Channel to Infiniband routing device; Infiniband to Fibre Channel routing device; iSCSI to ATA routing device; ATA to iSCSI routing device; iSCSI to Serial ATA routing device; Serial ATA to iSCSI routing device; Fibre Channel to Serial Attached SCSI routing device; Serial Attached SCSI to Fibre Channel routing device; iSCSI to Serial Attached SCSI routing device; Serial Attached SCSI to ISCSI routing device; Fibre Channel to ATA routing device; ATA to Fibre Channel routing device; Fibre Channel to ATA routing device; Serial ATA to Fibre Channel routing device; Fibre Channel to Serial SCSI Architecture routing device; Serial SCSI Architecture to Fibre Channel routing device; Infiniband to Serial Attached SCSI routing device; Serial Attached SCSI to Infiniband routing device. An example of a storage router includes the Crossroads 10000 storage router, manufactured by Crossroads Systems, Inc. of Austin, Tex.

Each element (e.g., storage element, medium transport element, data transfer element, import/export element) of media library 110 has a physical element address used by medium transport element 120 to locate and move tape cartridges (or other media). To comply with SCSI-2 and SCSI-3 standards, element addresses of a particular element type must be contiguous. Data transfer elements can also have a network or bus address (e.g., a LUN, an IP address or other address) and/or target number that is used to forward commands to those elements on a data transport medium (e.g., a bus or network). Similarly, media changer 115 can also have a LUN or other data transport medium address that is used in locating media changer 115 on a data transport medium. The target numbers and data transport medium addresses (e.g., LUNs or other data transport medium address), however, do not have to be contiguous.

As an example of contiguous element addresses within an element type, medium transport element 120 can have an element address of 00h, data storage elements 125a-y can have addresses of 20h-38h, import/export element 135 can have an address of 1C0h and data transfer elements 130a and 130b can have addresses of 1E0h-1E1h. Thus, for each element type, the elements of that type have contiguous physical element addresses. However, the blocks of addresses assigned to an element type do not have to be contiguous with the addresses assigned to other element types.

Information for a media library regarding element addresses is typically discovered through a MODE SENSE page. Table 1 illustrates an example MODE SENSE 0x1D page, as specified in the SCSI-2 and SCSI-3 standards, for physical media library 110 of the previous example:

TABLE 1

| Element Type | Starting Address | Number of Elements |
| --- | --- | --- |
| Medium Transport Element | 00h | 1 |
| Data Storage Element | 20h | 25 |
| Import/Export Element | 1C0h | 1 |
| Data Transfer Element | 1E0h | 2 |

The logical partitions presented to hosts, however may include elements of in an element type that do not have contiguous physical addresses. For example, controller 107 can divide physical media library 110 into the two example partitions, partition 160 ("Partition 1") and partition 165 ("Partition 2"), shown in Table 2 and Table 3 below:

TABLE 2

| Partition 1 |
| --- |
| Data Transfer Element: Drive #1 |
| Import Export Element 1 |
| Storage Elements: 1-2, 5-6, 9-10, 13-14, 17-18, 21-22 and 25 |

TABLE 3

| Partition 2 |
| --- |
| Data Transfer Element: Drive #2 |
| Import Export Element 0 (none) |
| Storage Elements: 3-4, 7-8, 11-12, 15-16, 19-20, 23-24 |

Controller 107 can associate Partition 1 with host 102a and Partition 2 with host 102b. Consequently, application 155a will see a media library with the elements of Partition 1 and application 155b will see a media library with the elements of Partition 2. Partition 1 and Partition 2 each contain elements of a particular element type (e.g., storage elements) that have noncontiguous physical element addresses. The physical element addresses can be mapped to logical element addresses such that the logical element addresses for each element of a particular element type are contiguous.

To establish logical-to-physical element address mapping for a partition, controller 107, according to one embodiment of the present invention, can select a base address for each element type. The base logical address can be predefined (e.g., a base address of 00h or other predefined address is always used for the medium changer element, a base address of 20h or other predefined address is always used for data storage elements and so on) or controller 107 can determine a base address for each element type when controller 107 creates a partition. For a particular partition, the base address of each element type can be selected so that the logical addresses of the elements of that element type do not overlap with the logical addresses for elements of another element type for the same partition. However, the logical address of an element for one partition may be the same as the logical address assigned to an element for another partition. Because the underlying physical media library generally uses a starting element address for each element type that will not lead to an overlap between physical element addresses, controller 107, according to one embodiment, can use the physical starting element address for each element type as the logical base address for that element type in the partitions. Using the example of Table 1, controller 107 can, for example, use a base element address of 00h for the medium transport element, a base element address of 20h for the data storage elements, a base element address of 1C0h for the import/export elements and a base element address of 1E0h for the base address of the data transfer elements.

Additionally, controller 107 can maintain a table or other data structure that associates an index with the physical element addresses of elements of each element type. For example, controller 107 can maintain Table 4 for the thirteen storage elements for Partition 1:

TABLE 4

| Index | Physical Address |
|---|---|
| 0 | 20h |
| 1 | 21h |
| 2 | 24h |
| 3 | 25h |
| 4 | 28h |
| 5 | 29h |
| 6 | 2Ch |
| 7 | 2Dh |
| 8 | 30h |
| 9 | 31h |
| A | 34h |
| B | 35h |
| C | 38h |

Similarly, controller 107 can maintain Table 5 to associate an index with the physical element addresses of the twelve storage elements of Partition 2:

TABLE 5

| Index | Physical Address |
|---|---|
| 0 | 22h |
| 1 | 23h |
| 2 | 26h |
| 3 | 27h |
| 4 | 2Ah |
| 5 | 2Bh |
| 6 | 2Eh |
| 7 | 2Fh |
| 8 | 32h |
| 9 | 33h |

TABLE 5-continued

| Index | Physical Address |
|---|---|
| A | 36h |
| B | 37h |

Table 4 and Table 5 are provided by way of example but not limitation. Similar tables or data structures can be maintained for other element types. As shown in Table 4 and Table 5 each physical element address for elements of an element type assigned to a partition is associated with an index value from an index of sequential index values (e.g., 0h-Ch and 0h-Bh).

According to one embodiment of the present invention, the logical element address of an element is determined from the base logical address in that partition for the element type plus the associated index value for the physical element address of the element. Using the example of Partition 1, the logical element address of the data storage element at physical element address 2Dh is 27h (i.e., 20h+7 from Table 4).

According to one embodiment, a host application can issue a Read Element Status command to controller 107 to read all the storage element addresses. Controller 107 can calculate the logical element addresses for a library partition by adding each associated index value to the logical base address for storage elements and can then utilize the results. For example, if controller 107 receives a READ ELEMENT STATUS command from application 155*b* to return all storage element status, controller 107 can calculate 20h, 21h, 22h, 23h, 24h, 25h, 26h, 27h, 28h, 29h, 2Ah and 2Bh (e.g., 20h+1, 20h+2, 20h+3, 20h+4, 20h+5, 20h+6, 20h+7, 20h+8, 20h+9, 20h+A, and 20h+B) as the logical storage element addresses. The controller can associate physical storage element addresses with each logical address. The controller creates a Read Element Status command to the physical library that will gather the application requested status, and issues the command to the physical library. After the controller receives the requested physical status, the controller uses the known association between logical and physical addresses to map physical element addresses in the received status to logical element addresses, and returns the result to the application. If a host application issues a more complex READ ELEMENT status requesting the status of disjoint elements, controller 107 can request the status of all elements from the physical media library. Controller 107 can map the status information for physical elements to the appropriate logical element address when returning the status information to the host application.

Similarly, physical element addresses can be resolved from logical element addresses by subtracting the base element address for an element type and using the result as an associated index value to look up the physical element address. As an example, if application 155*a* issues a MOVE MEDIUM command to move a tape cartridge from the storage element at element address 2Ch to the storage element at element address 21h, the logical element address 2Ch can be mapped to the physical element address 38h and the logical element address 21h can be mapped to the physical element address 21h. In this case, 2Ch-20h is Ch and 21h-20h is 1h. From Table 4, the associated index value Ch maps to physical element address 38h and the associated index value 1h maps to physical element address 21h.

Thus, according to one embodiment of the present invention, a controller that partitions a media library for multiple host applications can, for each partition, assign a base element address for an element type and associate physical element addresses for elements of an element type with an index value. For a partition, the logical element address corresponding to a physical element address for an element can be determined by adding the index number associated with the physical element address to the base element address for that element type. The physical element address corresponding to a logical element address for an element can be determined by subtracting the base element address for the element type from the logical element address for the element. The result of subtracting the base element address from the logical element address is an index value for which the associated physical element address can be found.

Figure 2:
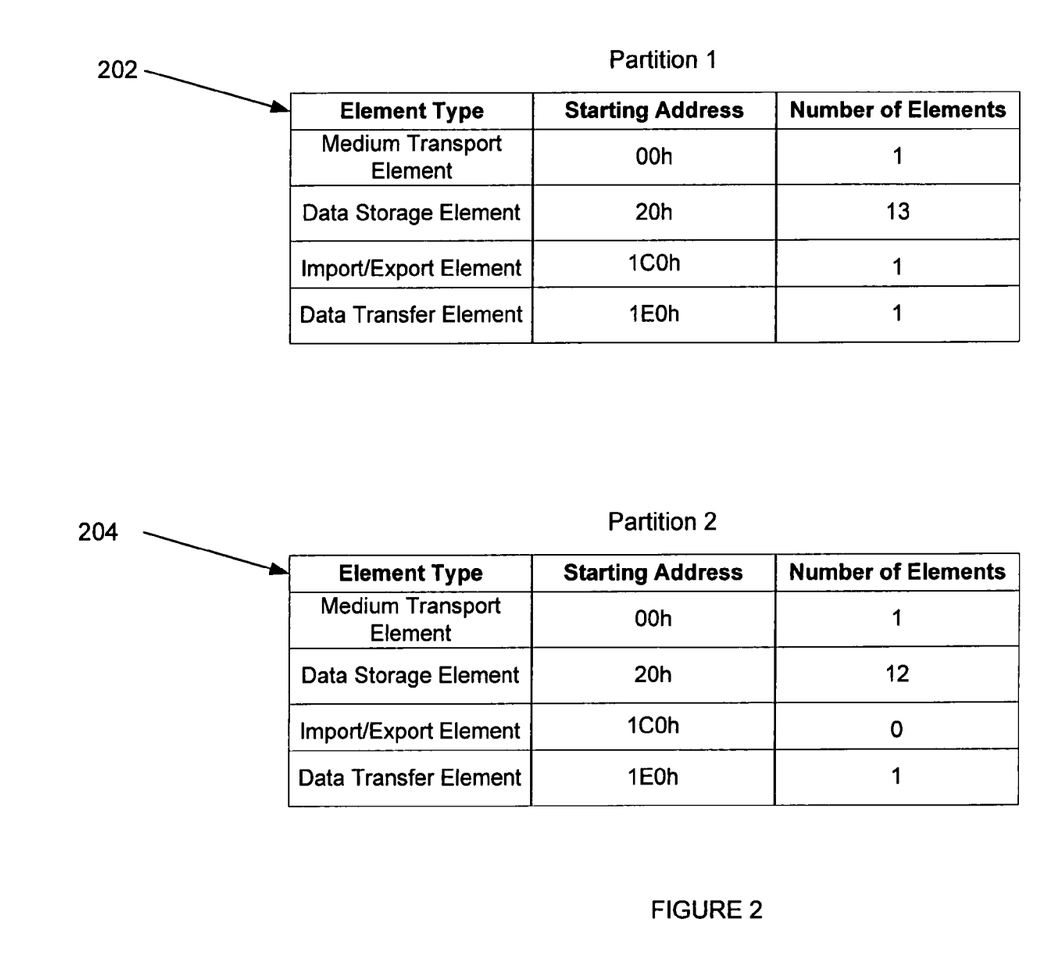
FIG. 2 is a diagrammatic representation of SCSI MODE SENSE Element Address Assignment ("EAA") pages according to one embodiment of the present invention.

Host applications can use a MODE SENSE command to discover information about available storage devices, such as media libraries, particularly the available elements and starting addresses. This information is returned in various mode sense pages, such as the 0x1D mode sense page. Turning briefly to FIG. 2 and using the example in which controller 107 uses the physical starting address for each element type as the logical base address for each element type, FIG. 2 provides a diagrammatic representation of example 0x1D mode sense pages that can be returned for each of Partition 1 and Partition 2. In this case, mode sense page 202 provides information regarding the available elements for Partition 1, while mode sense page 204 provides information regarding the available elements for Partition 2. In the example of mode sense page 202, the application receiving mode sense page 202 (e.g., application 155a of FIG. 1) will understand that the data storage elements have a base address of 20h and that there are thirteen available storage elements. If the application is SCSI-2 or SCSI-3 compliant, it will assume that the element addresses for the storage elements are contiguous and have element addresses of 20h through 2Ch. Similarly, the application receiving mode sense page 204 (e.g., application 155b of FIG. 1) may assume that there are twelve data storage elements with element addresses ranging from 20h-2Bh. MODE SENSE data can be stored at a controller (e.g., controller 107 of FIG. 1) and passed to a host application as, for example, described in U.S. patent application Ser. No., 11/046,019, entitled "System and Method for Handling Status Commands Directed to a Partitioned Media Library", to Justiss et al., Filed Jan. 28, 2005, which is hereby fully incorporated by reference herein.

While in the examples provided above, the addresses and index values are maintained in hexadecimal format, the addresses and index values can be maintained in other manners. Additionally, while only storage elements are indexed in the examples of Table 3 and Table 4, other element types can be similarly indexed to provide logical/physical address mapping. Additionally, it should be understood that the index values for an element type do not have to start at 0, but may start at any arbitrary number so long as the index values a sequential for an element type. Thus, for example, if the base address is 20h for Partition 1, and the index starts at 1, the logical element address for the element at physical element address 20h would be 21h. The 0x1D MODE SENSE page would then show the data storage elements beginning at 21h rather than the base logical address of 20h.

Figure 3:
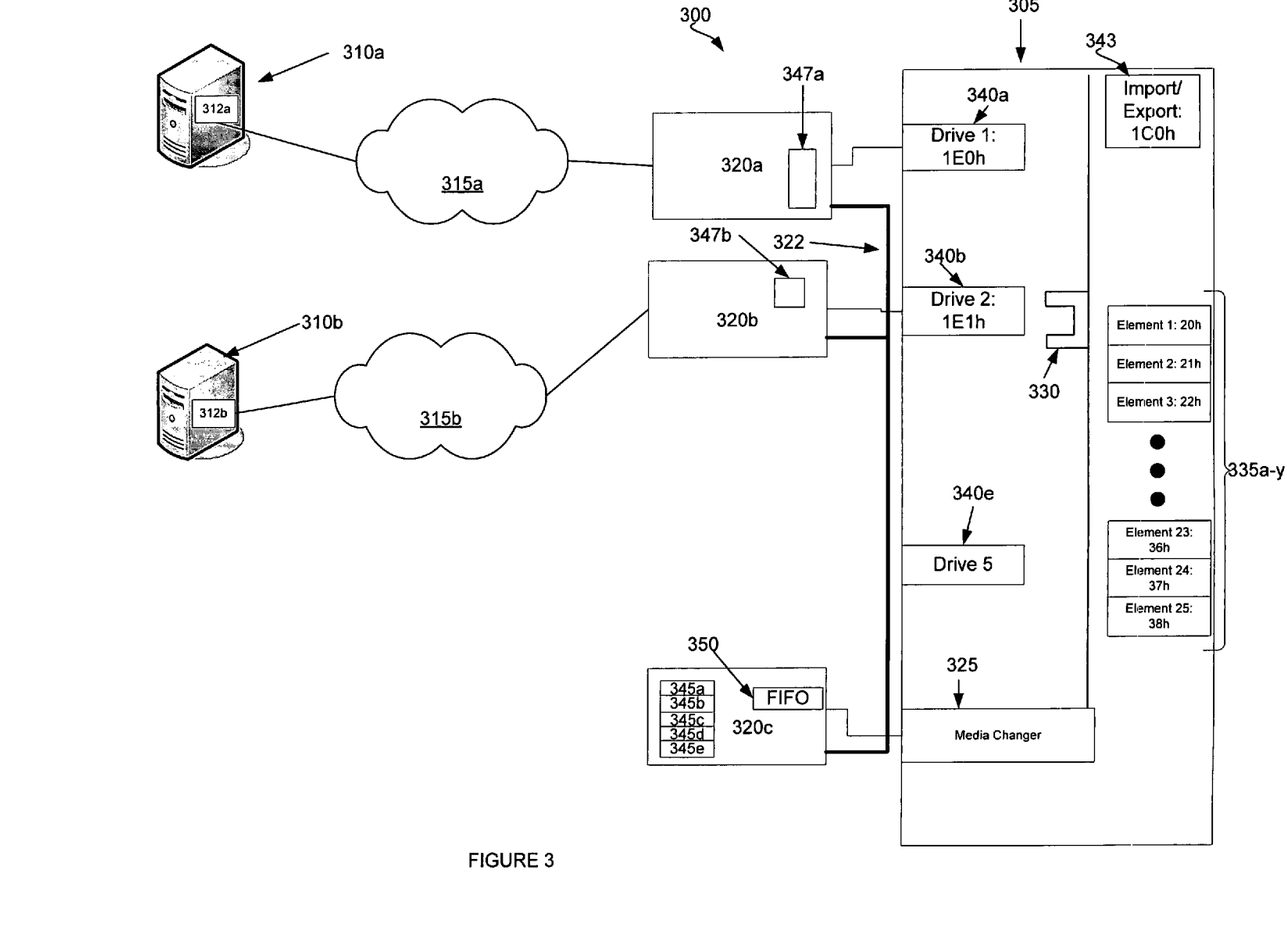
FIG. 3 is a diagrammatic representation of another embodiment of a system in which embodiments of the present invention can be implemented to provide centralized or distributed mapping between logical and physical element addresses.

In the example of FIG. 1, a physical media library is accessed through a single controller. According to other embodiments of the present invention, a physical media library can be accessed through multiple controllers. FIG. 3 is a diagrammatic representation of a system 300 in which a number of hosts have access to a media library 305 through various data transport media according to one embodiment of the present invention. In this embodiment, host 310a is connected to media library 305 via network 315a and controller 320a and host 310b is connected to media library 305 via network 315b and controller 320b. Each host can run one or more host applications (represented by host application 312a-b) configured to access a media library. Additionally, multiple hosts can be connected to media library 305 via the same network 315 and controller 320. Networks 315a-b, according to one embodiment of the present invention, can be a storage area networks ("SAN"), operating according to any data communication protocol known in the art, including SCSI, iSCSI, Fibre Channel, serial attached SCSI ("SAS"), advanced technology attachment ("ATA"), Serial ATA or other protocol known in the art. In other embodiments of the present invention, each network 315 can be the Internet, a LAN, a WAN, a wireless network or any other communications network known in the art. Media library 305 can communicate with each controller 320 according protocols including, but not limited to, SCSI, iSCSI, Fibre Channel, SAS, ATA, Serial ATA or other protocol known in the art. Controllers 320 can also communicate with each other via a control network 322 that can operate according any protocol known in the art.

Each controller 320 can include, for example, one or more communications interfaces to connect to media library 305 and to one or more other data transport media, such as a network (e.g., a SAN and/or a control network), processors and computer readable memories (RAM, ROM, magnetic disk, optical disk and/or other computer readable memory known in the art) that can store software instructions. The software instructions can be executable to control access by hosts on the respective data transport medium (e.g., network 315) to media library 305. Each controller, according to one embodiment of the present invention, can comprise a storage router.

Media library 305 can include media changer 325 with an associated medium transport element 330 (alternatively referred to as a "robot" or "picker"), multiple storage elements 335 (in this case, storage elements 335a-y) that can store storage volumes (e.g., tape cartridges, optical disks), data transfer elements (drives) 340a-b and one or more load (import/export) elements 343. The media changer 325 can control medium transport element 330. Medium transport element 330 physically moves storage volumes from one element to another. For example, medium transport element 330 can move a storage volume from a storage element to a data transfer element in response to a "Move Medium" command. In the case of a tape library, this can involve moving a tape cartridge from a slot to a drive so that data can be written to the magnetic tape in the cartridge.

For the sake of simplicity, it is assumed that media library 305 uses the same physical element addresses as media library 110 of FIG. 1. Media library 305 can be represented to host applications 312a and 312b as one or more partitions. When a host application searches a network for available media libraries, the controller controlling access to the media library for that host can make a media library partition available to the host application that represents a portion or all of a larger media library.

According to one embodiment, multiple media library partitions can be maintained by controller 320c for host applications. For example, controller 320c can maintain media library partition 345a for host application 312a and media library partition 345b for host application 312b. Each media library partition represents a host application's view of media library 305. For the sake of simplicity, it is assumed that partition 345a uses same logical element addresses as Partition 1 from FIG. 1 and partition 345b is the same logical element addresses as Partition 2 from FIG. 1. The media library partitions can be maintained as mapping logic and one or more tables or according to any storage scheme known in the art.

Each controller 320a-b can include software programming (represented by 347a-b) to present the media library partitions to the associated host application. Each controller 320a-b can maintain all the information for the appropriate media library partitions or only the information necessary to present the media library partition to a host and map commands to the appropriate data transfer element. For example, controller 320a may only include enough information to present media library partition 345a to host application 312a and forward commands to drive 340a and responses to host application 312a.

Each partition can include logical element addresses for the medium transport element, data transfer elements, storage elements and import/export elements assigned to that partition. Additionally, each partition can include logical network addresses or other data transport medium address for the data transfer elements and media changer. For example, if data transfer element 340a is at physical LUN 2, media library partition 345a can map this to logical LUN 3. Similarly, if media changer 325 is at physical LUN 0, it can be mapped, for example to logical LUN 1.

When host application 312a performs discovery on network 315a to find available media libraries, controller 320a can present media library partition 345a showing a data transfer element to logical LUN 3 and a media changer at logical LUN 1. Additionally, media library partition can have logical element addresses for storage elements, data transfer element 340a, medium transport element 330 and import/export element 343. If media library 305 is a tape library, host application 312a will consequently see an available tape library with one drive at LUN 3, having an element address of 1E0h, a media changer at LUN 1, thirteen cartridge slots with element addresses of 20h-2Ch, and an import/export element with an element address of 1C0h.

For commands directed to a data transfer element, a controller can forward the command to the appropriate data transfer element. For example, if media library partition 345a is presented to host application 312a, controller 320a can maintain at least the mapping between LUN 2 and LUN 3 such that if controller 320a receives a command directed to LUN 3, it can map the command to LUN 2 and forward the command to drive 340a. Additionally, controller 320a can perform any additional processing of the command depending on implementation.

For commands directed to media changer 325 (e.g., directed to logical LUN 1), on the other hand, the controller receiving the command (e.g., controller 320a) can forward the command to the controller connected to media changer 325 (e.g., controller 320c). If, for example, host application 312a wishes to move a tape cartridge from storage element 335d (i.e., the storage element at physical address 24h) to data transfer element 340a (i.e., the data transfer element at physical address 1E0h), it will issue a MOVE MEDIUM command to LUN 1, referencing logical storage element address 22h and logical data transfer element address 1E0h. Because the command is directed to LUN 1, controller 320a can forward the command to controller 320c.

Controller 320c, in turn, can map the logical data transport medium address to which the command is directed and the logical element addresses referenced by the command to the physical counterparts of media library 305. Thus, for example, controller 320c can map the command received from controller 320c to LUN 0. To determine the physical element addresses, controller 320c can subtract the base element address 20h from the logical element address of 22h to determine an index value, 2h in this case, and use a lookup table, such as Table 4, or other data structure to determine that 2h corresponds to physical address 24h. Additionally, controller 320c can determine that logical element address 1E0h for the data transfer element corresponds to physical element address 1E0h. Controller 320c therefore modifies the MOVE MEDIUM command to reference physical element addresses 24h and 1E0h and forwards the command to the media changer at LUN 0. Consequently, the command issued by host application 312a to LUN 1 to move a storage volume from the storage element address 22h to the data transfer element at element address 1E0h will be mapped to media changer 325 at LUN 0 to move the storage volume from the physical storage element address 24h to the data transfer element at physical element address 1E0h.

Thus far, FIG. 3 has been discussed in terms of a mapping scheme in which commands directed to media changer 325 from host applications have referenced logical element addresses mapped to physical element addresses at the controller associated with media changer 325 (e.g., controller 320c). In another embodiment scheme, each controller 320a-320b can perform the logical to physical mapping of element addresses for host applications. The commands using the physical element addresses can then be forwarded to controller 320c for forwarding to media changer 325. In this case, each of controller 320a-320b can maintain sufficient logic to perform mappings between physical and logical element addresses for all the host applications or the host applications that access media library 305 through that particular controller. In the former case, for example, each of controller 320a and 320b can maintain Table 4 and Table 5 to perform mappings between logical and physical element addresses. In the later case, controller 320a can maintain Table 4 to perform mappings for host application 312a and controller 320b can maintain Table 5 to perform mappings for host application 312b. In either case, the processing related to mapping between logical and physical element addresses is distributed among controllers 320a and 320b (e.g., controller 320a performs mapping for commands from host application 312a and controller 320b performs mapping for commands from host application 312b).

It should be noted that in many media libraries there is only one or a limited number of robots. Therefore, a media changer (e.g., media changer 325) can not handle concurrent commands or may only handle a few concurrent commands. Controller 320c, on the other hand, may receive many commands directed to media changer 325 from controllers 320a-b. Controller 320c can, therefore, prioritize commands to media changer 325. According to one embodiment of the present invention, controller 320e can maintain a FIFO buffer 350 for commands directed to media changer 325. In other embodiments of the present invention, other prioritization schemes can be employed, such as giving priority to commands from a particular other controller 320. Thus, controller 320c acts to serialize commands directed to media changer 325. It should be noted that controller 320c can also interface with one or more data transfer elements and receive commands directly from hosts.

Configuration of the library partitions can include specifying logical LUNS for media changer 325 and allocating storage elements, data transfer elements and import/export elements to each library partition. The allocation of storage elements to a library partition may include designation of a base logical address for the storage elements. The logical addresses of the storage elements can be determined based on the number of storage elements assigned to the partition and a sequential index, as described above. Alternatively, there may be no logical addresses presented by a particular controller 320, so that a host is presented with the actual physical addresses of media changer 325 and the storage elements. A host can also be presented with a mix of logical and physical addresses.

Partitioning configuration can also include allocating data transfer elements to each library partition. The designation of tape drives or other data transfer elements may include allocation of one or more data transfer elements connected to a particular controller 320 (e.g., by a SCSI bus or other data transport medium) or allocation of tape drives from a "virtualized pool" of tape drives. Such a "virtualized pool" of tape drives can be instantiated if the data transport interconnect between the controllers 320 and the tape drives is, for example Fibre Channel. A "pool" of drives can then be shared amongst the controllers 320 via the Fibre Channel fabric. As with storage elements, data transfer elements can be presented to hosts with logical or physical element addresses. Partitioning configuration can further include, for example, allocation of import/export elements to each partitioned library. The import/export elements, as with storage and data transfer elements, may or may not be assigned logical addresses.

The logical element addresses of the data transfer elements and the import/export elements can be derived in the same manner as the logical element addresses of the storage elements. To wit, the data transfer elements and import/export elements for a partition are assigned a base logical address and the logical addresses for the data transfer elements and import/export elements are determined using the base address for each element type and a sequential index associated with the physical addresses for the assigned elements.

According to one embodiment of the present invention, a library administrator can configure one of the controllers 320, such as controller 320c, with the library partitions. Configuration can be performed via a graphical, control line or other interface using a library control application. In yet another embodiment of the present invention, configuration can be performed using a library control application residing on an administrative computer. The administrative computer can be connected to controllers 320a-c via control network 322. The library partitions can be uploaded from the administrative computer to controller 320c and/or controllers 320a-b. If information is uploaded to only controller 320c, controller 320c can be responsible for sending any information necessary to controllers 320a-b to perform centralized or distributed mapping. Some configuration information can also be provided by the host applications. For example, U.S. patent application Ser. No. 11/046,066, entitled "System and Method for Mode Select Handling for a Partitioned Media Library" by Justiss et al., filed Jan. 28, 2005, which is hereby fully incorporated by reference herein describes one method for handling MODE SELECT commands directed to a partitioned media library.

Figure 4:
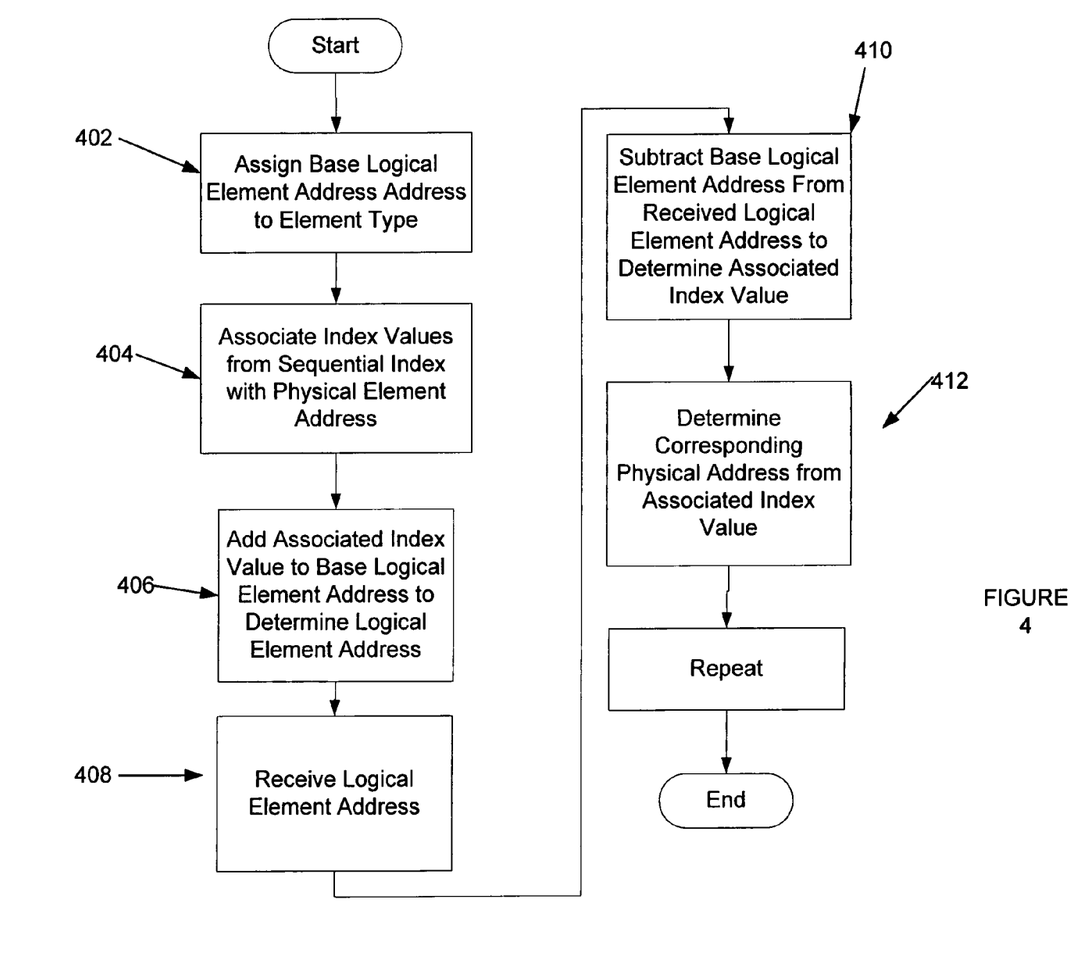
FIG. 4 is a flow chart illustrating one embodiment of a method for mapping between physical and logical element addresses.

FIG. 4 is a flow chart illustrating one embodiment of mapping a between a set of physical element addresses for a media library and a set of contiguous logical element addresses. For a particular element type, a base logical element address is established (step 402). Additionally, each physical element address in the set of physical element addresses being mapped for a partition is associated with an index value from an index of sequential values (step 404). For each physical element address, the corresponding logical element address is determined based on the base element logical address for the element type and the associated index value for that physical address. More particularly, the index value associated with a physical address is added to the base logical element address to determine the corresponding logical address (step 406).

When a logical element address is received (step 408), the corresponding physical element address can be determined based on the received logical element address, the base logical element address and the associated index value for the physical element address. According to one embodiment, the base logical element address is subtracted from the received logical element address to determine the associated index value for a physical address (step 410). The corresponding physical address can then be determined using its associated index value (e.g., from a lookup table or other data structure) (step 412). The method of FIG. 4 can be repeated for each element type for which physical elements addresses are being mapped to logical element addresses for a library partition. Moreover, the method of FIG. 4 can implemented as set of computer executable instructions stored on a computer readable medium.

Figure 5A:
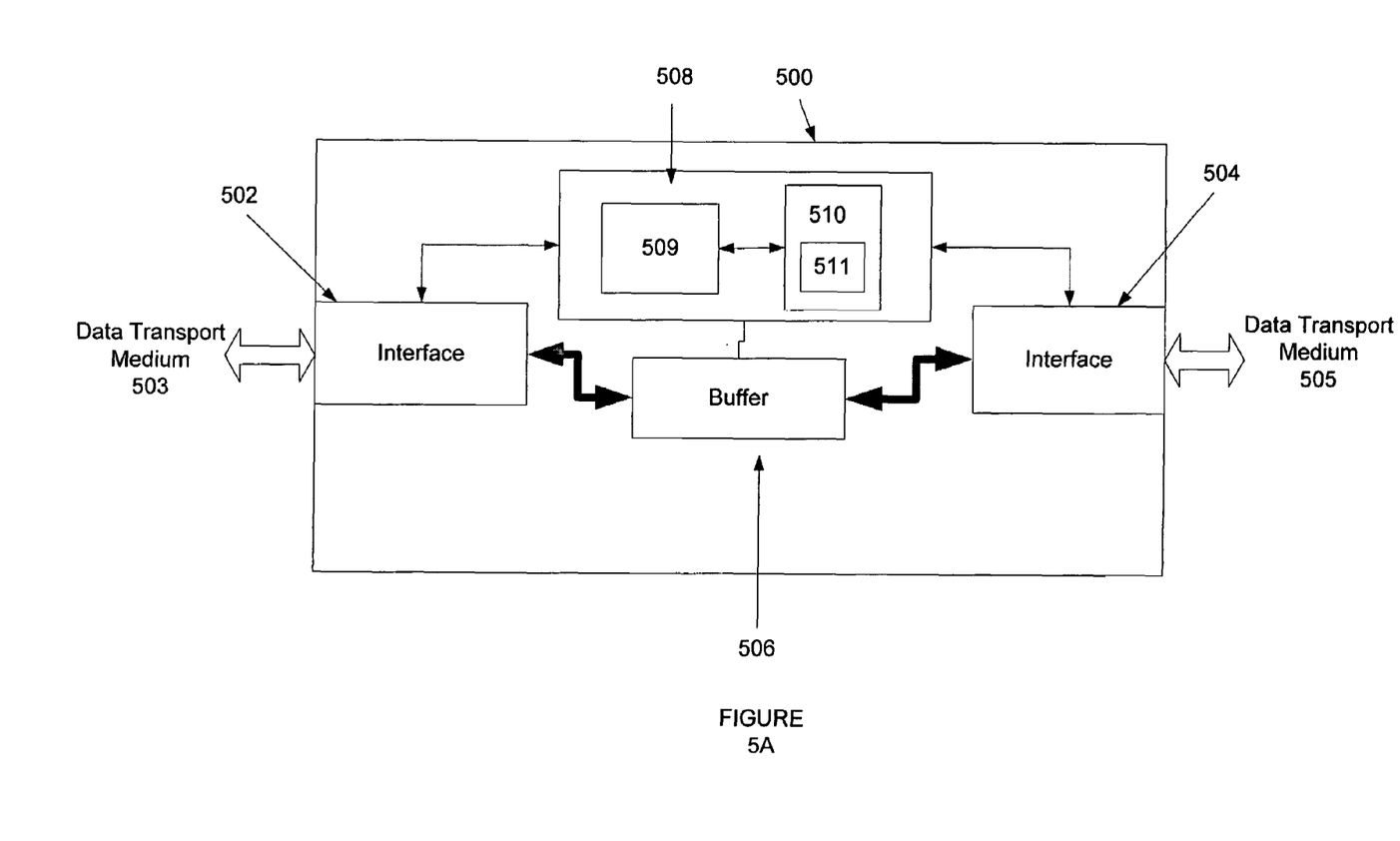
FIGS. 5A and 5B are diagrammatic representations of a controller according to one embodiment of the present invention.

FIG. 5A is a diagrammatic representation of one embodiment of a controller 500 according to the present invention. In the example of FIG. 5A, controller 500 is a storage routing device. Controller 500 can comprise a first transport medium interface 502 that interfaces with a first transport medium 503 and a second transport medium interface 504 that interfaces with a second transport medium 505. In one embodiment of the present invention, the first transport medium 503 can be a Fibre Channel transport medium, the second transport medium 505 a SCSI bus, interface 502 a Fibre Channel controller, such as a fibre channel controller based on the TACHYON family of fibre channel control chips and interface 504 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5500x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and Serial ATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and Serial ATA; Fibre Channel and Fibre Advanced Technology Attachment ("FATA"); Serial ATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 506 provides memory work space and is connected to both interface 502 and to interface 504. Buffer 506 can be located remotely from routing device 500 and can also comprise multiple buffers. A processing unit 508 can be connected to interface 502, interface 504 and buffer 506.

According to one embodiment of the present invention, processing unit 508 comprises one or more processors 509 for controlling operation of controller 500 and a computer readable medium 510 accessible by the processor storing a set of computer instructions 511 that are executable by the processor. According to other embodiments of the present invention buffer 506 and/or computer readable medium 511 can be onboard processor 510.

In one implementation (not shown), the controller 500 can be a rack mount or free standing device with an internal power supply. Controller 500 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the controller 500 can support SCSI direct and sequential access target devices and can support SCSI initiators, as well. The Fibre Channel port can interface to fibre channel enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, present library partitions, map between logical and physical addresses and generate commands and provide appropriate translations between the FC and SCSI data transport protocols (and for other protocols if necessary for other embodiments).

Figure 5B:
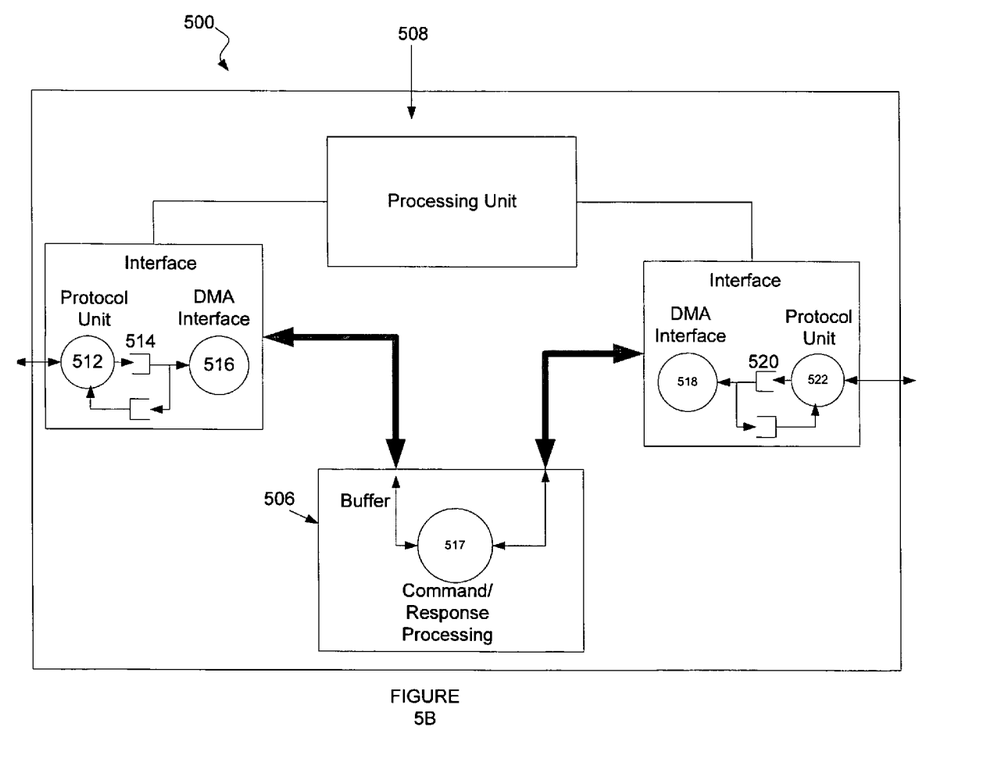

FIG. 5B is a block diagram of one embodiment of data flow within the controller 500 of FIG. 5A. As shown, data from first transport medium 503 (e.g., the Fibre Channel transport medium) is processed by a protocol unit 512 (e.g., a Fibre Channel protocol unit) and placed in a FIFO queue 514. A direct memory access (DMA) interface 516 can then take data out of FIFO queue 514 and places it in buffer 506.

Processing unit 508 processes the data in buffer 506 as represented by processing 517. This processing can include mapping between physical and logical addresses for elements of media library. A DMA interface 518 then pulls data from buffer 506 and places it into a buffer 520. A second protocol unit 522 pulls data from buffer 520 and communicates the data on the second transport medium 505 (e.g., the SCSI bus). Data flow in the reverse direction, from the second data transport medium 505 to the first data transport medium 503, can be accomplished in a reverse manner.

In one embodiment, processing unit 508 can be operable to establish a library partition to a host on first data transport medium 503. This can include selecting a base logical element address for an element type, associating an index with a set of physical element addresses and determining the corresponding logical element address by, for example, adding the base logical element address to the associated index value for a physical element address. Additionally, processing unit 508 can be operable to determine a physical element address for a logical element address. This can be done, for example, by subtracting the base logical element address from the logical element address to determine an associated index value. Using the associated index value, the processing unit can determine the appropriate physical element address.

It should be noted that the example of the controller of FIGS. 5A and 5B is provided by way of example. Embodiments of the present invention can be implemented in devices such as storage routing devices or other devices. Additionally, embodiments of the present invention can be implemented has hardware and/or software programming. Embodiments can be implemented through execution of computer instructions stored on any computer readable medium known in the art (e.g., optical disk, magnetic disk, flash memory, RAM, ROM, EEPROM or other computer readable medium).

Thus, embodiments of the present invention provide a mechanism for mapping between a set of physical element addresses for a media library and a set of contiguous logical element addresses that can be implemented at a controller such as a storage routing device or other device in the command path between a host application and a media library. This can include selecting a base logical element address for an element type and associating each physical element address for elements of the element type with an index value from an index of sequential index values. Each physical element address can be mapped to a corresponding logical element address based on the associated index value and the base logical element address. More particularly, for a physical element address, the associated index value can be added to the base logical address to determine the corresponding logical element address for the physical element address. Even if there is at least one physical element address that is not contiguous with the next physical element address in the set of physical element addresses being mapped, the logical element addresses for the element type will be contiguous.

A particular logical address (e.g., a logical address given in a command) can be mapped to a corresponding physical address based on the particular logical address, the base logical address and the associated index value for the corresponding physical address. According to one embodiment, the base logical element address is subtracted from the given logical element address to derive the associated index value. The corresponding physical address can then be determined as it is associated with this index value.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill changes and additional embodiments are within scope of the invention as claimed below.

What is claimed is:

1. A method for mapping between physical element addresses of a media library and a set of contiguous logical element addresses comprising:

establishing a base logical element address for an element type;

associating each physical element address from a set of physical element addresses for elements of the element type with an index value from a set of sequential index values, wherein at least one physical element address in the set of physical element addresses is not contiguous with a next numerically greater physical element address;

maintaining a mapping between the set of physical element addresses and the set of sequential index values; and for each physical element address from the set of physical element addresses, determining a corresponding logical element address based on an associated index value for that physical element address and the base logical element address.

2. The method of claim 1, wherein for each physical element address, determining a corresponding logical element address based on that physical element address, the associated index value and the base logical element address comprises adding the associated index value to the base logical element address.

3. The method of claim 1, further comprising determining a corresponding physical element address for a particular logical element address based on the particular logical element address, the base logical element address and the associated index value for the corresponding physical element address.

4. The method of claim 3, wherein determining a corresponding physical element address for a received logical element address based on the received logical element address, the base logical element address and the associated index value for the corresponding physical element address further comprises:

subtracting the base logical element address from the received logical element address to determine the associated index value for the corresponding physical element address;

determining the corresponding physical element address using the associated index value for the corresponding physical element address.

5. The method of claim 1, wherein the index comprises sequential index values beginning at zero.

6. The method of claim 1, wherein the set of physical element addresses correspond to physical storage element addresses, physical data transfer element addresses or physical import/export element addresses of the media library.

7. The method of claim 1, further comprising:

receiving a command referencing a set of logical element addresses;

mapping the logical element addresses to corresponding physical element addresses based on the logical element addresses in the set of logical element addresses, the base logical element address and the associated index value for each corresponding physical element address.

8. The method of claim 1, further comprising:

presenting the corresponding logical element address for each physical element address as a media library partition to a host application.

9. A computer program product comprising a set of computer instructions stored a computer readable medium, wherein the set of computer instructions comprise instructions executable to:

establish a base logical element address for an element type;

associate each physical element address from a set of physical element addresses for elements of the element type with an index value from a set of sequential index values, wherein at least one physical element address in the set of physical element addresses is not contiguous with a next numerically greater physical element address;

maintain a mapping between the set of physical element addresses and the set of sequential index values; and for each physical element address from the set of physical element addresses, determine a corresponding logical element address based on an associated index value for that physical element address and the base logical element address.

10. The computer program product of claim 9, wherein the set of computer instructions further comprise instructions executable to add the associated index value to the base logical element address to determine the corresponding logical element address for a physical element address.

11. The computer program product of claim 9, wherein the set of computer instructions further comprise instructions executable to determine a corresponding physical element address for a received logical element address based on the received logical element address, the base logical element address and the associated index value for the corresponding physical element address.

12. The computer program product of claim 11, wherein the instructions executable to determine a corresponding physical element address for a received logical element address based on the received logical element address, the base logical element address and the associated index value for the corresponding physical element address are executable to:

subtract the base logical element address from the received logical element address to determine the associated index value for the corresponding physical element address; and determine the corresponding physical element address using the associated index value for the corresponding physical element address.

13. The computer program product of claim 9, wherein the index comprises sequential index values beginning at zero.

14. The computer program product claim 9, wherein the set of physical element addresses correspond to physical storage element addresses, physical data transfer element addresses or physical import/export element addresses of the media library.

15. The computer program product of claim 9, wherein the set of computer instructions further comprise instructions executable to:

receive a command referencing a set of logical element addresses; and map the logical element addresses to corresponding physical element addresses based on the logical element addresses in the set of logical element addresses, the base logical element address and the associated index value for each corresponding physical element address.

16. The computer program product of claim 9, wherein the set of computer instructions further comprise instructions executable to present the corresponding logical element address for each physical element address as a media library partition to a host application.

17. A controller to control access to a media library comprising:

a first interface to connect to a first data transport medium;

a second interface to connect to a second data transport medium;

a buffer to provide a memory workspace for the controller connected to the first interface and the second interface;

a processing unit coupled to the first interface, the second interface and the buffer, the processing unit operable to:

establish a base logical element address for an element type;

associate each physical element address from a set of physical element addresses for elements of the element type with an index value from a set of sequential index values, wherein at least one physical element address in the set of physical element addresses is not contiguous with a next numerically greater physical element address;

maintain a mapping between the set of physical element addresses and the set of sequential index values; and for each physical element address from the set of physical element addresses, determine a corresponding logical element address based on an associated index value for that physical element address and the base logical element address.

18. The controller of claim 17, wherein the processing unit is further operable to determine a corresponding logical element address based on an associated index value for that physical element address and the base logical element address by adding the associated index value for that physical element address to the base logical element address.

19. The controller of claim 17, wherein the processing unit is further operable to determine a corresponding physical element address for a received logical element address based on the received logical element address, the base logical element address and the associated index value for the corresponding physical element address.

20. The controller of claim 19, wherein the processing unit is operable to determine a corresponding physical element address for a received logical element address by:

subtracting the base logical element address from the received logical element address to determine the associated index value for the corresponding physical element address; and determining the corresponding physical element address using the associated index value.

* * * * *